May 8, 1951          M. T. SKINNER          2,551,709
TRAILER HITCH
Filed Jan. 10, 1948
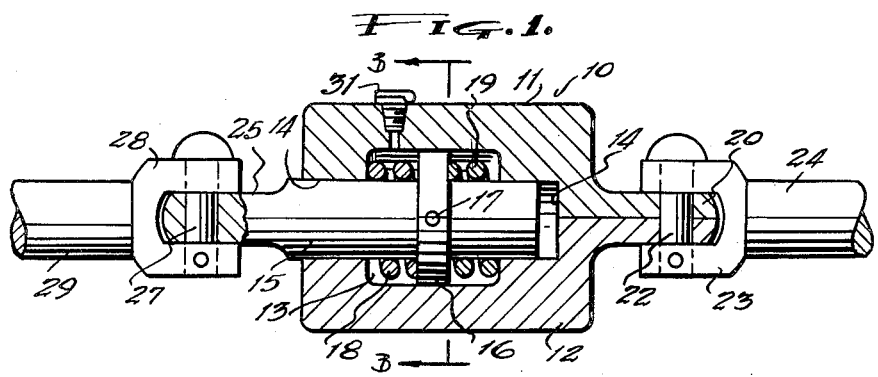
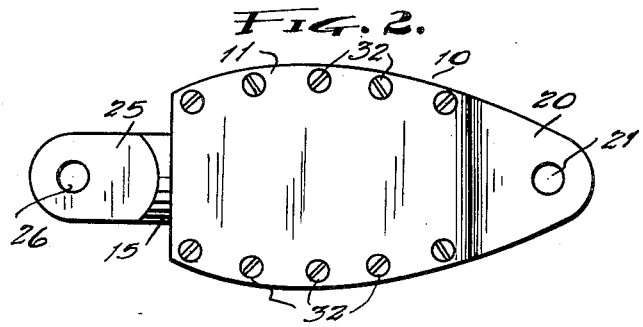
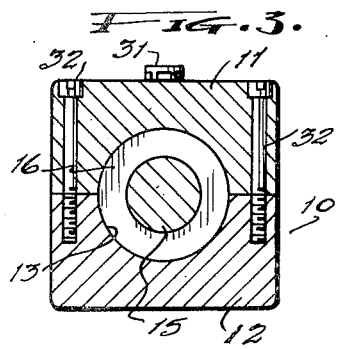
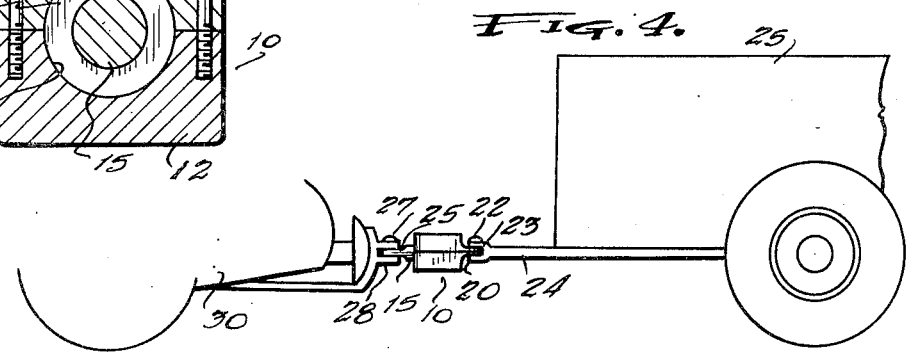
M. T. SKINNER
INVENTOR.
BY Cecil L. Wood
ATTORNEY Patented May 8, 1951

2,551,709

UNITED STATES PATENT OFFICE 2,551,709

TRAILER HITCH

M. T. Skinner, Weatherford, Tex.

Application January 10, 1948, Serial No. 1,509

1 Claim. (Cl. 280—33.9)

This invention relates to towing devices, such as trailer hitches, and the like, providing for an arrangement for the safe coupling of a trailer with a motor vehicle, and may be employed with any type of conventional utility or residential type of trailer, and its principal object resides in the provision of a simple and compact arrangement whereby a hitch is provided which is universal in its operation, capable of swiveling so that the towing vehicle and the drawn vehicle might function in all types of normal positions such, for example, as on irregular terrain, rough and rutted roads, and the like, so that the relative positions of the separate vehicles, regardless of their inclinations, may not disrupt the normal movement of either.

A further object of the invention resides in the provision of a hitch which can be arranged in such a manner that horizontal pivots are provided as well as a rotative association between the vehicles, and a special shock absorber is provided in the main body of the device which is adapted to cushion the shocks occasioned by road irregularities, and the like, as the vehicles are moved therealong, affording a medium for absorbing the shock in forward motion and relieving, by a cushioning action, any shock occasioned by the sudden stop of the towing vehicle as against the drawn vehicle.

Broadly, the invention contemplates the provision of a simple and inexpensive structure, capable of being employed as a special coupling, between a drawn vehicle and a trailer, or other vehicle, and capable of being formed in sections so that its assembly is simplified, and providing for lubrication of the parts to afford longer life and smoother operation of the assembly.

While the foregoing objects are paramount, other and lesser objects will become manifest as the description proceeds, taken in connection with the appended drawings wherein:

Figure 1 is a longitudinal cross-sectional illustration of the invention, showing the opposing sections thereof providing the internal chamber, and fragmentarily illustrating conventional hitch devices to which it is pivotally attachable.

Figure 2 is a plan view of the invention illustrating the integral coupling rearwardly of the main body and the pivotal draw stem forwardly of the said body.

Figure 3 is a transverse cross-sectional illustration showing the two opposing sections coupled by securing screws, and Figure 4 is a schematic illustration showing the invention coupled between a towing vehicle and a trailer.

The invention, therefore, in its preferred form comprises a main body 10 which is formed in two opposing sections 11 and 12, each of which is formed with one-half of a semi-cylindrical recess intermediate the ends which, when the sections 11 and 12 are opposingly arranged, as in Figures 1 and 3, provides a cylindrical chamber 13. Smaller semi-cylindrical recesses are formed in the sections 11 and 12 axially of the larger diameter recesses and form a circular bore 14 which extends through the forward end of the body 10, as illustrated in Figure 1, and terminates within the latter rearwardly thereof, providing only a cylindrical recess. The two opposing sections 11 and 12 are coupled by a number of screws 32.

The bore 14 is provided to accommodate a draw stem 15 which is slidably arranged therein and has a collar 16 rigidly secured thereon as by a set screw 17, or the like, and which normally is positioned intermediate the ends of the chamber 13, being maintained centrally thereof by coil springs 18 and 19 arranged on each side of the collar 16 whereby tension is applied to the draw stem 15 in both directions and road shocks are cushioned by these members in the forward movement of the vehicles, as well as in starting and stopping. Meanwhile, the inner end of the draw stem 15 extends into the recess formed rearwardly of the chamber 13.

Rearwardly of the body 10 is an integral flange 20 which has an aperture 21 therethrough to receive a pin 22 which may be arranged through a clevis 23 integral with any suitable coupling 24 for the towed vehicle, such as a trailer 25, or the like. The draw stem 15 is rotatable within the chamber 13 and the bore 14 and has its forward end 25 flattened and an aperture 26 is provided therein to receive a pin 27 to secure a clevis 28 thereto and which is preferably integral with a suitable coupling 29 to be attached to the towing vehicle. Obviously, any type of hitch may be employed for attaching the draw stem 15 to the towing vehicle, as in the structure illustrated in Figure 4.

It will be observed that the invention is designed to provide for free movement of the draw stem longitudinally of the body 10 as well as rotatively therein, so that the arrangement will be capable of universal action between the towing vehicle 30 and the trailer 25, providing for variations in inclinations of each vehicle, and with respect to each other, compensating for variations in terrain over which the vehicles are moved while providing for the minimization of shock while starting and stopping the vehicles by the tensioning devices 18 and 19 arranged within the body 10 on each side of the collar 16. A fitting 31 is arranged in the body 10 providing for the lubrication of the parts 16, 18 and 19 within the chamber 13 of the body 10. Obviously, any type of lubrication arrangement may be provided.

Manifestly, the construction herein shown and described may be modified from time to time, by persons skilled in the art, without departing from the spirit and intent of the invention or the scope of the appended claim.

What is claimed is:

In a trailer hitch for motor vehicles, a compact body member formed with a pair of opposing sections, each having a semi-circular recess formed axially therein capable of defining a hollow circular chamber in opposing operative arrangement, smaller semi-circular recesses formed axially of said first named recesses in each section and extending forwardly and rearwardly thereof and providing a communication from said chamber forwardly of said body member in operative association of said sections, a draw stem operatively arranged in said communication and having means on its outer end providing for connection with a motor vehicle, a collar rigidly secured on said stem and slidably arranged in said chamber, and a spring arranged about said stem on each side of said collar to cushion said stem in longitudinal operation in said body.

M. T. SKINNER.

REFERENCES CITED

The following references are of record in the file of this patent:

UNITED STATES PATENTS

| Number | Name | Date |
|---|---|---|
| 2,067,794 | Seyferth | Jan. 12, 1937 |
| 2,444,305 | Milhizer | Jan. 29, 1948 |

FOREIGN PATENTS

| Number | Country | Date |
|---|---|---|
| 481,968 | Great Britain | Mar. 22, 1938 |